May 25, 1965 J. GOLDBERG 3,185,880
ELECTRON STREAM DEFLECTION APPARATUS
Filed June 30, 1961 2 Sheets-Sheet 1

*INVENTOR.*
JACOB GOLDBERG
*BY* Leo M. Kelly
AGENT

May 25, 1965 J. GOLDBERG 3,185,880

ELECTRON STREAM DEFLECTION APPARATUS

Filed June 30, 1961 2 Sheets-Sheet 2

INVENTOR.
JACOB GOLDBERG
BY Leo M. Kelly
AGENT

United States Patent Office 3,185,880

Patented May 25, 1965

3,185,880

ELECTRON STREAM DEFLECTION APPARATUS

Jacob Goldberg, Burlington, Mass., assignor to Edgerton, Germeshausen & Grier, Inc., Boston, Mass., a corporation of Massachusetts

Filed June 30, 1961, Ser. No. 121,231

7 Claims. (Cl. 313—78)

This invention relates to electron-stream deflection apparatus and more particularly to single-ended electrostatic deflection systems.

Heretofore, in electrostatic electron-stream deflection systems, the prior art has concentrated upon balanced or push-pull systems. In such systems the electron stream passes between a pair of similar deflection plates which are connected to deflection signals of equal potential but of opposite polarity. The electrostatic field produced by these signals exerts a force upon the electron stream, causing the stream to deflect from its original path. The difficulty in obtaining accurately balanced signals has long been a problem resulting in certain limitations and disadvantages in the use of balanced deflection systems.

Signals rarely occur as balanced pairs and it is, therefore, necessary to employ additional electronic equipment to generate a counterpart to the original signal which is both equal in potential and opposite in polarity to the original signal. Amplifiers, pulse inverters, transformers, and other electronic equipment have been used for this purpose.

Due to the inherent limitations of these devices, the counterpart signal so generated is not a mirror-image of the original signal and for this reason there is a loss of fidelity in the resulting electrostatic field produced by the original and the imperfect counterpart signals.

Single-ended deflection systems, that is, systems in which the original deflection signal is connected to one deflection plate while the second deflection plate is held at a reference potential, have the advantage over the balanced systems of not requiring the generation of a counterpart signal. Single-ended systems have received limited attention in the prior art because "spot distortion" has been severe. "Spot distortion," as used herein, is defined as the increase in the size of the dot produced by the electron stream upon the viewing screen as the stream is deflected from its zero deflection path.

It is, therefore, an object of this invention to provide a new and novel deflection system which is not subject to the above-mentioned disadvantages of prior-art devices.

Another object of this invention is to provide a new cathode-ray tube having a single-ended deflection system in which spot distortion is comparable with or superior to balanced-deflection systems.

Other and further objects will be explained hereinafter and will be more particularly pointed out in the appended claims.

In summary, it has been discovered that vastly improved electron-stream deflection apparatus can be achieved by using two electrostatic deflection plates of different lengths and applying the deflection signal to the shorter of said plates while maintaining the longer plate at a reference potential. Preferred constructional details are hereinafter discussed.

The invention will now be discussed in connection with the accompanying drawings, FIGURE 1 of which is a schematic diagram of a cathode-ray tube utilizing a deflection system designed in accordance with the principle of this invention.

Figure 1:
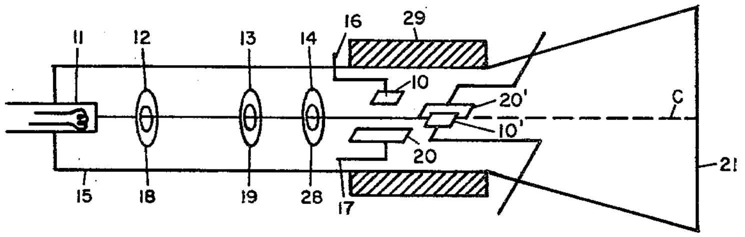

FIGURE 1 shows a conventional cathode-ray tube employing the deflection system of this invention. An electron gun for producing a stream of electrons is comprised of a thermionic cathode 11 from which electrons are emitted, a control grid 12 having a central aperture 18 through which the electrons emitted by the cathode 11 are passed in response to appropriate accelerating voltages, and an anode electrode 13 through whose aperture 19 the accelerated electrons may pass. The electron stream continues through the aperture 28 of electrode 14 which serves as an aperture stop or limiting device for controlling the divergence of the electron stream. Thence the stream enters into the overlapping fields produced by the focusing coil 29 and the vertical and horizontal deflection plates 10–20 and 10′–20′. The electron stream is deflected in accordance with the potential of the vertical and horizontal deflecting signals applied to plates 10 and 10′, as hereinafter explained and focused to impinge as a spot upon a fluorescent phosphor viewing screen 21, or the like. The focusing and deflection fields are designed to overlap in order to provide greater sensitivity as disclosed in U.S. Letters Patent No. 2,977,501, issued on March 28, 1961 to K. J. Germeshausen, S. Goldberg and D. F. McDonald, entitled "Cathode-Ray Apparatus and Method."

Figure 2:
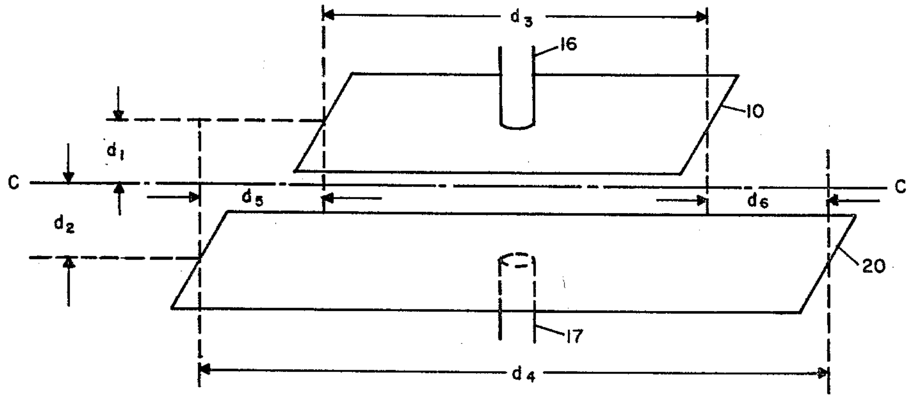
FIGURE 2 is an enlarged perspective view of one set of the deflection plates shown schematically in FIGURE 1.

One set of the deflection plates shown in FIGURE 1 and designed in accordance with the principle of this invention is shown in greater detail in FIGURE 2. The deflection plates 10 and 20, by means of conductive lead 16 of, for example, kovar, which also serves as a support for the plate 10. The longer plate 20 is supported by conductive lead 17 which is connected to a source of reference potential, for example, ground. It is also intended that plate 20 resemble the equipotential plane which exists at the half way point between a pair of balanced deflection plates having balanced voltages. This plane is a plane of symmetry for the electric field and potential distributions.

Homogeneous deflection fields produce a fundamental geometrical focusing error (spot distortion). This error is found in the increase in size of the spot produced on the screen 21 by the electron stream as it is deflected from a straight-line path. The increase in spot dimension is in the direction of deflection. Theoreticaly, this error should be the same for both single-ended and balanced deflection systems. Prior-art single-ended systems, however, were subject to much greater error than balanced systems and it is for this reason single-ended systems have had limited application. In these prior art devices, both plates were substantially the same length. I have discovered that the cause of the greater error in the prior-art single-ended systems was due to fringing fields located at each end of the deflection field, that is, where the electron stream enters into and exits from the deflection field as it passes from the cathode 11 to the screen 21. These fringing fields are often made even more severe by adjacent structures within the tube upon which these fringing fields may terminate. By extending the plate 20 at both ends and selectively placing plates 10 and 20 with respect to adjacent tube structures, the fringing fields are made to terminate on the plate 20 itself thereby favorably minimizing the effect of these fields on the electron stream. As is shown in FIGURE 2, plate 20 extends a distance $d_5$ ahead of plate 10 at the entrance to the deflection area and a distance $d_6$ beyond the plate 10 at the exit of the deflection area. By virtue of the extensions of plate 20 as compared to plate 10, the field distribution resembles that existing between one plate of a pair of balanced deflection plates, and the equipotential plane half way between the balanced pair. By making the reference potential of plate 20 substantially the same as the potential of adjacent sections of the tube envelope 15 and the closest electrode 14, interfering electrostatic fields are eliminated.

Deflection plates 10 and 20 are shown positioned unequal distances from the center line C of the electron stream. The distance from the center line C to deflection plates 10 and 20 is indicated by $d_1$ and $d_2$ respectively. The longer plate 20 is shown further removed from center line C than plate 10 in order to provide symmetrical scan by the stream on the screen 21. Were the distances $d_1$ and $d_2$ equal, then the end of plate 20 which is closer to screen 21 than the corresponding end of plate 10, would in some cases interfere with the maximum scan by the stream in the direction of plate 20. This is corrected by positioning plate 20 further from center line C than plate 10. Another means of providing symmetrical scan would be to tilt plate 20 in a slightly downward direction so that its end nearer the screen 21 is further from center line C than the corresponding end of plate 10.

The length of plates 10 and 20 are shown as $d_3$ and $d_4$ respectively. Plate 20, acting as an equipotential plane, would, theoretically, have an infinite length in a balanced system. Practically, however, I have discovered that if each of the extensions $d_5$ and $d_6$ of plate 20 are at least one and one-half times the distance between plates 10 and 30 measured at the corresponding ends of plate 10, and the deflection plates are so positioned that the fringing fields are not significantly affected by adjacent tube elements, then the fundamental geometrical focusing error (spot distortion) is no greater, and may be significantly less, than that found in balanced deflection systems. In the drawing of FIGURE 2, the plates 10 and 20 are shown parallel to each other and, therefore, the distance between them is the same at both ends of plate 10. Where, however, plate 20 is tilted slightly in downward direction in order to provide symmetrical scan on the viewing screen 21, the distance between plates 10 and 20 is different at each end of plate 10, thereby requiring a different extension of plate 20 at each end. Significant increases in distances $d_5$ and $d_6$ over one and one-half times the separation of plates 10 and 20, will not further significantly decrease spot distortion, but, by reducing distances $d_5$ and $d_6$ below this value, the advantages in overcoming spot distortion are accordingly lessened.

In a cathode-ray tube of the type shown in FIGURE 1, a deflection system having the following dimensions produced smaller geometrical focusing errors than were produced with a conventional balanced deflection system:

| | |
|---|---|
| $d_1$=0.075 inch | $d_4$=1.625 inches |
| $d_2$=0.125 inch | $d_5$=0.313 inch |
| $d_3$=1.000 inch | $d_6$=0.313 inch |

Figure 3:
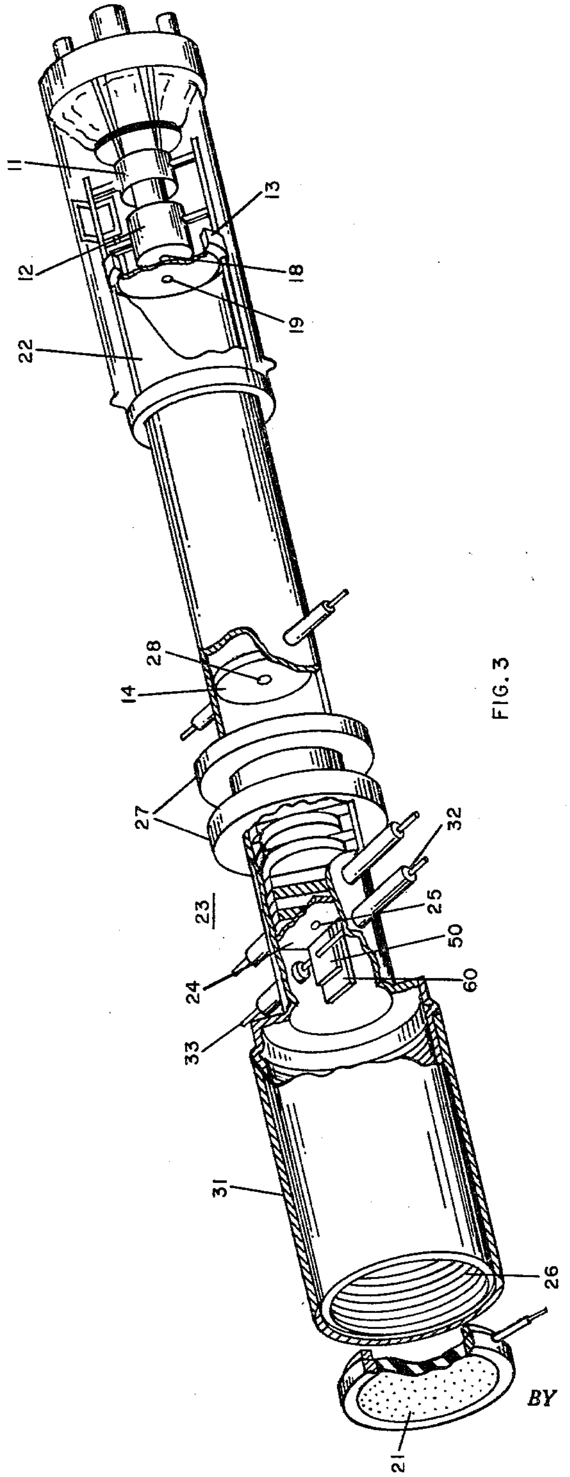
FIGURE 3 is a perspective view of a cathode-ray tube utilizing a modification of this invention and partially cut away to illustrate details of construction.

FIGURE 3 illustrates the use of a modification of this invention in a traveling-wave deflection tube of the type disclosed in the aforesaid U.S. Letters Patent. The electron gun comprises a conventional electron-emitting cathode element 11, a cylindrical control-grid electrode 12 having a central aperture 18, and a first anode 13 with a central aperture 19. A second anode, shown as a hollow cylinder 22, is employed to decelerate the electron stream to permit the presence of lower electron stream velocities in the region of the focusing rings 27, the traveling wave helical deflection system 23 and in the sweep deflection region 50–60.

The decelerated electron stream passes through the aperture 28 of electrode 14 which serves to limit the divergence of the electron stream. After passing through the aforesaid region of the focusing rings 27 and the helical deflectors 23, the stream passes through a shielding electrode 24 having a central aperture 25.

A single-ended sweep deflection system 50–60 designed in accordance with the principles of this invention, is employed to provide the horizontal sweep. Post-deflection acceleration is obtained by means of the high-resistance spiral aquadag coating 26 deposited on the inside of tube section 31 intermediate the sweep deflection plates 50–60 and the phosphor viewing screen 21.

Deflection plate 50 is supported by the coaxial lead-in connector 32 which carries the sweep deflection signal to plate 50. Deflection plate 60 is supported by and connected to a reference potential through coaxial lead-in connector 33.

Due to the proximity of deflection plates 50 and 60 to electrode 24 which would tend to interfere with the fringe of the deflection field at the entrance to the deflection region, I have discovered that in such applications, a more suitable positioning of plates 50 and 60 is one slightly different from that shown in FIGURE 2. By mounting the plates as shown in FIGURE 4, that is, by increasing $d_5$ beyond the previously given minimum value; by reducing the distance between plates 50 and 60, $d_1$ and $d_2$, to the minimum, consistent with the cross-sectional dimension of the electron stream and the desired scan on the viewing screen 21; and by maintaining electrode 24 and plate 60 at the same potential; the effect of the fringing fields are greatly reduced, resulting not only in a marked decrease in the geometrical focusing error but also in greater deflection sensitivity.

The distances represented in FIGURE 4, corresponding to the travelling wave cathode-ray tube shown in FIGURE 3 were as follows:

| | |
|---|---|
| $d_1$=0.064 inch | $d_4$=1.750 inches |
| $d_2$=0.106 inch | $d_5$=0.438 inch |
| $d_3$=1.000 inch | $d_6$=0.313 inch |

Figure 4:
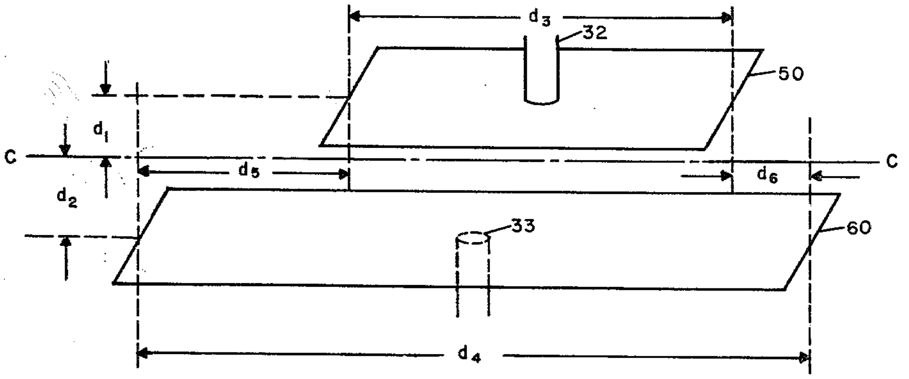
FIGURE 4 is an enlarged perspective view of the horizontal deflection system of the tube in FIGURE 3.

By comparing the distances employed in FIGURES 2 and 4, it can be seen that, in effect, plate 60 has been extended at the end near the interfering adjacent structure, electrode 24, thereby increasing the distance from the active plate 50 to electrode 24 to move a substantial portion of the fringing field away from electrode 24. In addition, a slight reduction was made in the distance between the plates 50 and 60 which also reduces the extent of fringing from the vicinity of plates 50 and 60. By making the reductions in distances $d_1$ and $d_2$ proportional, symmetrical scan of the stream on the screen 21 is retained.

Although I have described my invention with a certain degree of particularity, it is not to be inferred that the invention is so limited and modifications are deemed to fall within the spirit and scope of this invention as hereinafter claimed.

I claim:

1. An electron-stream deflection system comprising:

a first electrostatic deflection plate having a substantially planar surface positioned adjacent to the electron stream;

a second electrostatic deflection plate having a substantially planar surface positioned adjacent to the electron stream on the side opposite to the first plate with its surface facing the surface of the first plate, said second deflection plate extending a greater distance along the path of the electron stream in both directions than does the first plate, and said second plate being also disposed a greater distance from the path of the electron stream than the first plate, measured when the electron stream is not subject to any deflection forces, to provide substantially symmetrical scan of the electron stream, the distance that the second plate extends further along the path of the electron stream than the first plate in both directions is at least one and one-half times the spacing between the first and second plates measured at the ends of the first plate nearer each extension;

means for connecting the first plate to a source of deflecting signals; and means for connecting the second plate to a reference potential.

2. An electron-stream deflection system as claimed in claim 1 and in which the first and second plates are parallel to each other.

3. An electron-stream deflection system as claimed in claim 1 and in which the distance between the first and second deflection plates is less at the end where the electron stream enters the space between the two plates than at the end where it leaves the space between the two plates.

4. An electron-stream deflection system as claimed in claim 1 and in which the said reference potential is ground.

5. An electron-stream deflection system comprising, in combination:

a first pair of deflection plates having substantially planar surfaces of different lengths disposed facing each other on opposite sides of the electron stream;

a second pair of deflection plates having substantially planar surfaces of different lengths disposed facing each other on opposite sides of the electron stream and orthogonally orientated with respect to the first pair of plates, the shorter plate of each pair is disposed closer to the path of the electron stream than the other plate of each pair, measured when the electron stream is not subject to any deflection forces, to provide substantially symmetrical scans, the longer plate of each pair extending a greater distance along the path of the electron stream in both directions than the shorter plate of each pair, the greater distance being at least one and one-half times the spacing between the plates of each pair, measured at the ends of the shorter plates nearer the extensions;

means for separately connecting the shorter plate of each pair to separate sources of deflection signals; and means for connecting the longer plate of each pair to a reference potential.

6. An electron-stream deflection system as claimed in claim 5 and in which the reference potential to which the longer plates are connected is a common ground.

7. In a cathode-ray tube of the type having an electron gun for emitting a source of electrons, electron-stream forming, controlling and accelerating electrodes, a focusing system and a display screen, an electron-stream deflection system comprising:

a first electrostatic deflection plate having a substantially planar surface positioned adjacent to the electron stream;

a second electrostatic deflection plate having a substantially planar surface positioned adjacent to the electron stream on the side opposite to the first plate with its surface facing the surface of the first plate, said second plate extending a greater distance along the path of the electron stream in both directions than does the first plate, the greater distance being at least one and one-half times the spacing between the two plates measured at the ends of the first plate nearer each extension, and said second plate being also disposed a greater distance from the path of the electron stream than the first plate, measured when the electron stream is not subject to any deflection forces, to provide substantially symmetrical scan of the electron stream;

means for connecting the first plate to a source of deflecting signals; and means for connecting the second plate to a reference potential, said reference potential being substantially equal to the potential of the closest of the said electrodes to said second plate.

References Cited in the file of this patent

UNITED STATES PATENTS

| | | |
|---|---|---|
| 2,977,501 | Jerneshausen et al. | Mar. 28, 1961 |

FOREIGN PATENTS

| | | |
|---|---|---|
| 427,090 | Great Britain | Apr. 15, 1935 |
| 473,673 | Great Britain | Oct. 18, 1937 |

UNITED STATES PATENT OFFICE
CERTIFICATE OF CORRECTION

Patent No. 3,185,880 May 25, 1965

Jacob Goldberg

It is hereby certified that error appears in the above numbered patent requiring correction and that the said Letters Patent should read as corrected below.

Column 2, line 33, before "plates" insert -- signal is fed to the shorter plate 10 of the pair of deflection --; column 3, line 29, for "10 and 30" read -- 10 and 20 --; column 6, line 35, for "Jernneshausen et al." read -- Germeshausen et al. --.

Signed and sealed this 30th day of November 1965.

(SEAL)
Attest:

ERNEST W. SWIDER
Attesting Officer

EDWARD J. BRENNER
Commissioner of Patents